May 7, 1946.  N. B. MURPHY  2,399,821
DISCONNECT DEVICE
Filed May 10, 1944   2 Sheets-Sheet 1
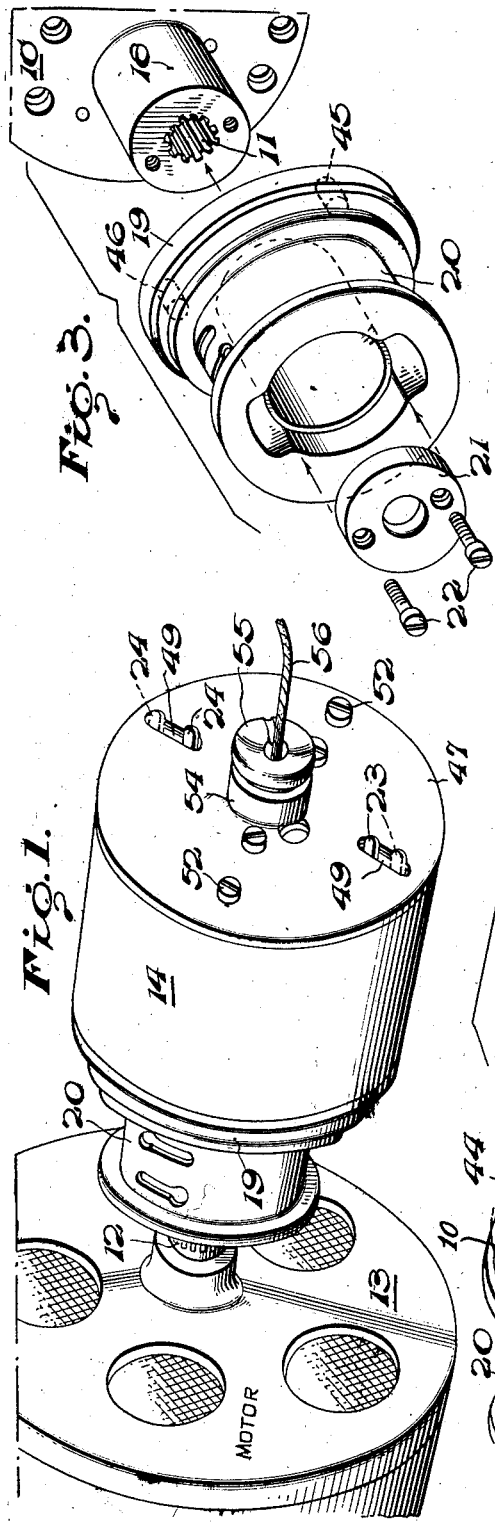
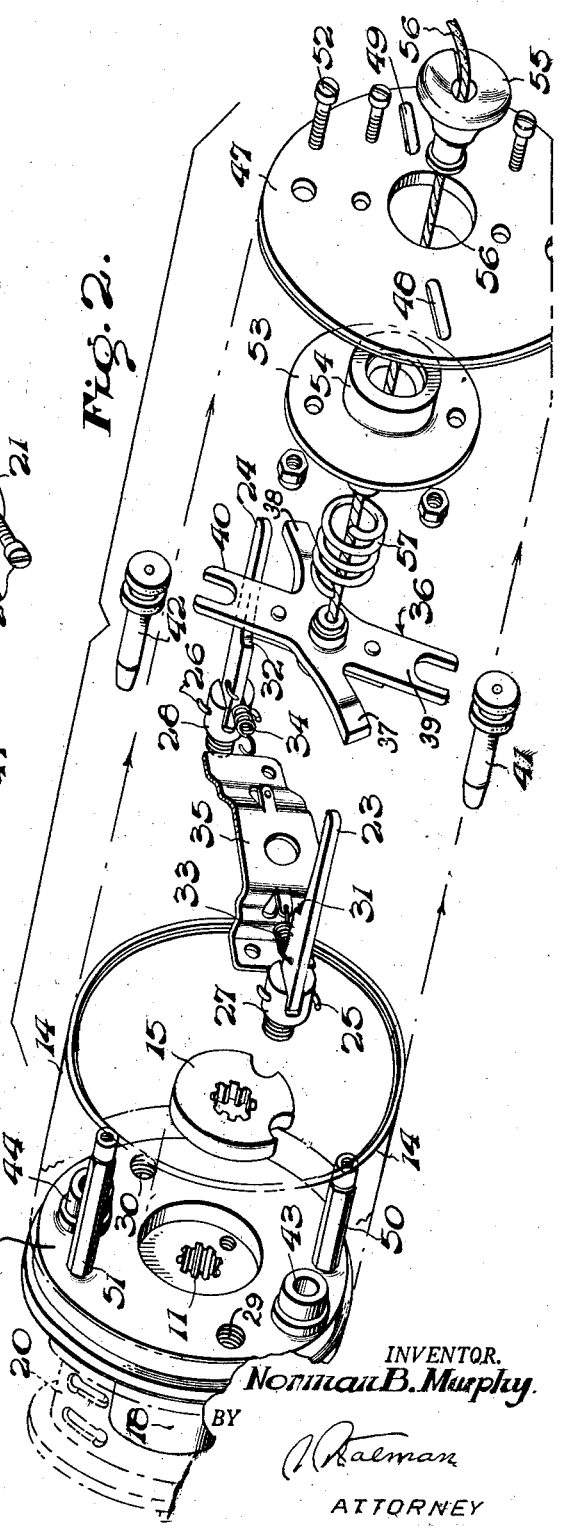
INVENTOR.
Norman B. Murphy.
BY
ATTORNEY May 7, 1946. N. B. MURPHY 2,399,821
DISCONNECT DEVICE
Filed May 10, 1944 2 Sheets-Sheet 2
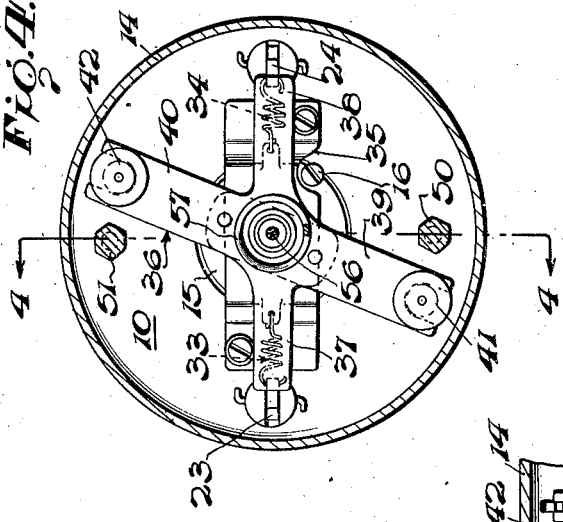
INVENTOR.
Norman B. Murphy.
BY
ATTORNEY Patented May 7, 1946

2,399,821

UNITED STATES PATENT OFFICE 2,399,821

DISCONNECT DEVICE

Norman B. Murphy, West Englewood, N. J., assignor to Bendix Aviation Corporation, Teterboro, N. J., a corporation of Delaware Application May 10, 1944, Serial No. 534,969

11 Claims. (Cl. 192—25)

This invention relates to disconnecting apparatus and more particularly to emergency disengaging means for automatic control systems for aircraft.

It is desirable in automatic control devices such as automatic pilots for aircraft, for example, to provide a releasable coupling between the servo motor and the control surface it operates, whereby at any time the servo motor may be disconnected from the control surface and the latter operated manually. Emergency disconnect devices to this end have been proposed in the past but these all possess certain disadvantages which have been eliminated by the novel disconnect device of the present invention.

An object of the present invention, therefore, is to provide a novel releasable coupling which operates rapidly and positively to disconnect a driven member from a driving member.

Another object of the invention is to provide a novel emergency disconnect device adapted for use with automatic pilots in aircraft whereby a control surface may be rapidly and positively uncoupled from a driving motor.

A further object is to provide a novel pin type disconnect device having a plurality of pins which connect a driving member with a driven member, the pins being adapted for retraction from one of the members whereby the driving coupling therebetween is broken.

Another object is to provide a novel emergency disconnect device for automatic pilots in aircraft whereby a control surface is normally drivably coupled with a servo motor and which may be operated at will to break the driving coupling, the operating mechanism of the coupling being automatically locked in the uncoupled position, provision being made whereby such mechanism may be unlocked manually whereupon the drivable connection between the control surface and the servo motor will be re-established.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views;

Figure 1 is a perspective view of the novel emergency disconnect of the present invention as applied to a servo motor;

Figure 2 is an exploded perspective view of the novel emergency disconnect device of Figure 1;

Figure 3 is a fragmentary showing in perspective of a portion of the structure of Figure 2;

Figure 4 is a top elevation view of the novel disconnect of Figure 1 with the top cover removed;

Figure 5 is a sectional view taken substantially along line 4—4 of Figure 4; and Figure 6 is a fragmentary detail view illustrating the coupling device in an operative position.

The novel emergency disconnect device of the present invention generally comprises a clutch embodying one or more pins interposed between a driving and driven member to normally couple the members in a drivable manner. One or more locking members are provided which serve the double function of guiding movement of the clutch as well as of holding the clutch in an uncoupled position after the driven and driving members have been disconnected. The locking member or members extend exterior of the casing which embodies the entire mechanism so that subsequent to an uncoupling operation, the clutch may be unlocked from the exterior of the casing whereupon under the action of a resilient member it will be driven to establish a drivable connection between the driven and driving members.

Referring now to the drawings for a more detailed description of the present invention, the novel emergency disconnect is shown in Figure 5 as comprising a driving member or hub 10 having a splined opening 11 for the reception of a splined shaft 12 of a servo or driving motor 13 (Figure 1). A cylindrical casing 14 is suitably fastened to hub 10 and shaft 12 is adapted to extend somewhat into the interior of the casing to pass through a centrally splined retaining ring 15 which is adapted for fastening to the driving member by means of a bolt 16 (Figure 5). If desired, a bolt 17 may be interposed between member 10 and the ring, as shown in Figure 6, and the ring thereafter tightened to the hub through bolt 16 whereby the ring will "bite" into the shaft to define a better lock between the shaft and the driving hub.

Sleeved about the decreased portion 18 of hub 10 is a driven bushing 19 which has suitably fastened thereto a pulley 20. A retaining ring 21 rests against the bushing and is fastened to portion 18 of hub 10 by means of screws 22 whereby the bushing and pulley are maintained on the driving hub for motion relative to the hub when the bushing and the hub are uncoupled and for motion therewith when the two are drivably connected by the novel coupling of the present invention to be described hereinafter. The foregoing described driving and driven parts are better shown in an unassembled condition in Figure 3.

In accordance with the present invention, a pair of levers 23 and 24, in the form of fingers or latches, better shown in Figure 2, are provided which are pivotally mounted by virtue of pins 25 and 26 upon bolts 27 and 28, the latter being received by threaded apertures 29 and 30 formed on driving hub 10. The levers are provided with corresponding latch portions 31 and 32 and both are normally yieldably urged toward each other by virtue of springs 33 and 34 which at one end are anchored to the levers and at their opposite ends are anchored to a bridge element 35 which, in turn, is likewise fastened to driving hub 10.

A clutch in the form of a spider member 36 is provided having a pair of guide arms 37 and 38 which are engaged by levers 23 and 24 as better shown in Figure 4. The spider, moreover, is also provided with a second pair of arms 39 and 40 having slots at their outermost ends for the reception of a pair of pins 41 and 42. These pins normally rest within inserts 43 and 44 fastened to and passing through driving hub 10 and under certain conditions, to be presently described, are urged beyond the driving hub to be received within holes 45 and 46 drilled in bushing 19. In such an event the driving and driven members will be drivably connected with each other in the manner shown in Figure 6.

The open end of casing 14 is closed by a cover plate 47 provided with slots 48 and 49 through which the ends of levers 23 and 24 extend exterior of the casing as shown in Figure 1 for a purpose to be hereinafter described. Spacers 50 and 51 (Figure 5), secured at one end to driving hub 10, support and fasten cover plate 47 to casing 14 by means of screws 52. An annular member 53 is secured to cover 47 and is provided with a boss 54 which extends through the cover through an opening formed therein for such purpose. A flared insert 55 is mounted within boss 54 and is provided with a central aperture adapted for receiving a cable 56 therein, the cable passing through the interior of the casing to be anchored to spider 36. Sleeved about the cable and interposed between the spider and annular member 53 is a relatively strong spring 57 which, under certain conditions, is adapted for urging spider 36 and pins 41 and 42 toward driven bushing 19.

Considering now the operation of the novel emergency disconnect device, hereinabove described, the spider 36 is normally maintained in a retracted or uncoupled position by virtue of levers 23 and 24 which are yieldably urged toward the spider whereby the arms 37 and 38 rest upon latch portions 31 and 32 of the levers. In this condition spring 57 is at its maximum tension and pins 41 and 42 though resting within inserts 43 and 44 of hub 10 are out of engagement with holes 45 and 46 of the driven member or bushing 19. The driven and driving members are thus in an uncoupled condition and the driving member will rotate relative to bushing 19 and pulley 20.

When it is desired to establish a drivable connection between the pulley 20 and the servo motor, the operator need merely grasp the extending portions of levers 23 and 24 exterior of the casing and urge them outwardly away from each other from the full line position to the dotted line position of Figure 1. As a result, the latch portions 31 and 32 are drawn away from the path of arms 37 and 38 whereupon spring 57 exerts its full driving force on spider 36 to urge the latter inwardly and cause pins 41 and 42 to fall into holes 45 and 46 of bushing 19 whereupon a drivable connection is established between the servo motor and the pulley.

Should, for some reason, such as in the case of an emergency, for example, it become necessary to uncouple the servo motor from the pulley, the operator need merely grasp cable 56 and by a moderate pull thereon retract the spider and also pins 41 and 42 from out of engagement with holes 45 and 46. Since levers 23 and 24 are spring loaded they are being urged inwardly at all times and as soon as arms 37 and 38 of the spider pass over the latch portions 31 and 32, the levers will snap toward each other locking the spider in its retracted position, spring 57 being re-loaded as a result of such operation so as to be in readiness for a subsequent re-coupling of the servo motor and the pulley.

In actual installation, the cables for the control surface extending from the operator manual controls may be wound about pulley 20 or, if desired, the main cables may be free of the pulley and an auxiliary cable provided on the pulley spliced or otherwise suitably connected to the main control cable. Thus, when it is desired to place the ship under automatic steering control, levers 23 and 24 are operated from the exterior of casing 14 whereupon the servo motor becomes immediately and positively coupled with the pulley and its operation is transmitted to the main cable. In case of an emergency, the pilot pulls cable 56 to uncouple the driving connection between the motor and the pulley to thereby facilitate manual control of the surfaces.

Although but a single embodiment of the present invention has been illustrated and described in detail, it is to be expressly understood that the invention is not limited thereto. Various changes may be made in the design and arrangement of parts without departing from the spirit and scope of the invention as will now be understood by those skilled in the art. For a definition of the limits of the invention, reference will be had primarily to the appended claims.

I claim:

1. A coupling device for drivably coupling a driving member to a driven member comprising a relatively movable pin supporting member carried by said driving member, said supporting member having a first position wherein said pin engages said driven member to establish a drivable connection between said driving and driven members and a second position wherein said members are disconnected, a pivotally mounted finger supported by said driving member and adapted to serve as a latch for said pin supporting member, means yieldably urging said finger to lock said pin supporting member in said second position, said finger being adapted for unlocking said pin supporting member, and resilient means for urging said supporting member to said first position when said supporting member has been unlocked by said finger.

2. A coupling device for drivably connecting a driving member to a driven member comprising a relatively movable spider supported by said driving member, a plurality of pins carried by said spider, receptive means in said driven member for cooperating with said pins, said spider having a first position wherein said pins engage said receptive means to thereby establish a drivable connection between said driving and driven members and a second position wherein said pins are held out of engagement with said receptive means whereby said driving and driven members are disconnected, a plurality of pivotally mounted fingers, yieldably urged to lock said spider in said second position, said fingers being adapted for unlocking said spider, and resilient means for urging said spider to said first position when said spider has been unlocked by said fingers.

3. A coupling device for drivably connecting a driving member to a driven member comprising a relatively movable spider supported by said driving member, a plurality of pins carried by said spider, receptive means on said driven member for cooperating with said pins, said spider having a first position wherein said pins engage said receptive means to thereby establish a drivable connection between said driving and driven members and a second position wherein said pins are held out of engagement with said receptive means whereby said driving and driven members are disconnected, a plurality of pivotally mounted fingers yieldably urged to lock said spider in said second position, said fingers being adapted for unlocking said spider, resilient means for urging said spider to said first position when said spider has been unlocked by said fingers, and means for retracting said spider from said first position to said second position whereupon said fingers lock said spider in said last-named position.

4. In combination, a driving member, a driven member, a pivotally mounted finger carried by said driving member, clutch means adapted for movement in a direction substantially lengthwise of said finger in one direction to engage said driven member and in the opposite direction to disengage said driven member, said finger being yieldably urged to maintain said clutch means in a disengaged condition and operative to release said clutch means, and resilient means for urging said clutch means to engage said driven member when said finger has been operated to release said clutch means.

5. In combination, a driving member, a driven member, a pivotally mounted finger carried by said driving member, clutch means adapted for movement in a direction substantially lengthwise of said finger in one direction to engage said driven member and in the opposite direction to disengage said driven member, said finger being yieldably urged to maintain said clutch means in a disengaged condition and operative to release said clutch means, resilient means for urging said clutch means to engage said driven member when said finger has been operated to release said clutch means, and means for operating said clutch means to a disengaged condition whereupon said finger engages said clutch means to maintain it in said last-named condition.

6. In combination, a driving member, a driven member, a plurality of pivotally mounted fingers carried by said driving member, a spider provided with a plurality of pins thereon, means for guiding said spider and pins for movement toward said driven member whereby said pins engage said driven member to define a drivable connection therebetween, means yieldably urging said fingers to lock said spider in a position wherein said pins are out of engagement with said driven member, said fingers being adapted for operation to release said spider, and a resilient member for urging said spider toward said driven member when said fingers have released said spider whereby said pins drivably engage said driven member.

7. An emergency disconnect device comprising a casing, a driving member supporting said casing, a driven member adapted to be driven by said driving member, a plurality of pivotally mounted fingers carried by said driving member, a spider provided with a plurality of pins thereon and guided for movement in a direction substantially lengthwise of said fingers toward said driven member whereby said pins engage said driven member to define a drivable connection therebetween, means yieldably urging said fingers to lock said spider in a position wherein said pins are out of engagement with said driven member, and a resilient member between said casing and said spider, said casing being provided with apertures through which said fingers extend, said fingers being adapted for manual operation to release said spider whereby said resilient member drives said spider toward said driven member to cause a drivable connection between said pins and said driven member.

8. An emergency disconnect device comprising a casing, a driving member supporting said casing, a driven member adapted to be driven by said driving member, a plurality of pivotally mounted fingers carried by said driving member, a spider provided with a plurality of pins thereon and guided for movement in a direction substantially lengthwise of said fingers toward said driven member whereby said pins engage said driven member to define a drivable connection therebetween, means yieldably urging said fingers to lock said spider in a position wherein said pins are out of engagement with said driven member, a resilient member between said casing and said spider, said casing being provided with apertures through which said fingers extend, said fingers being adapted for manual operation to release said spider whereby said resilient member drives said spider toward said driven member to provide a drivable connection between said pins and said driven member, and means connected with said spider for disengaging said pins from said driven member, said fingers being yieldably urged to maintain said spider in said last-named position.

9. An emergency disconnect device comprising a casing, a driving member supporting said casing, a driven member adapted to be driven by said driving member, clutch means movably supported by one of said members and having a first position for drivably engaging the other of said members and a second position wherein said members are disconnected, yieldably urged means for locking said clutch means in said second position, and a resilient member interposed between said casing and said clutch means for urging said clutch means to said first position when said yieldably urged means releases said clutch, said casing being provided with apertures through which said yieldably urged means extend thereby being adapted for manual operation whereby said clutch means may be released from the exterior of said casing.

10. In combination, a driving member, a driven member, a clutch comprising registering means on said driving and driven members and engaging means carried by said driving member for connecting and disconnecting said registering means, a yieldably urged lever carried by said driving member for maintaining said clutch engaging means disconnected from said registering means on said driven member, said lever being adapted for releasing said engaging means to effect connection of said engaging means with said registering means, and means for urging said engaging means to a position for connecting said registering means when said lever has been operated to release said engaging means.

11. In combination, a driving member, a driven member, a clutch comprising registering means on said driving and driven members and engaging means carried by said driving member for connecting and disconnecting said registering means, said engaging means comprising at least one engaging member thereon for engaging said registering means to establish a drivable connection between said driving and driven members, a pivotally mounted lever on said driving member and adapted to serve as a latch for holding said engaging means out of engagement with said registering means on said driven member, said lever being displaceable for releasing said engaging means, and means acting upon said engaging means for urging said engaging means into engagement with said registering means on said driving and driven members when said lever has been operated to release said engaging means.

NORMAN B. MURPHY.